US011789621B2

(12) United States Patent
Brinkmann (10) Patent No.: US 11,789,621 B2
(45) Date of Patent: Oct. 17, 2023

(54) METHOD AND SYSTEM FOR CONTROLLING A SWITCH IN THE EXECUTION MODE OF A PROCESSOR

(71) Applicant: Johannes Gutenberg-Universität Mainz, Mainz (DE)

(72) Inventor: André Brinkmann, Mainz (DE)

(73) Assignee: JOHANNES GUTENBERG-UNIVERSITAT MAINZ, Mainz (DE)

( * ) Notice: Subject to any disclaimer, the term of this patent is extended or adjusted under 35 U.S.C. 154(b) by 116 days.

(21) Appl. No.: 17/105,771

(22) Filed: Nov. 27, 2020

(65) Prior Publication Data

US 2021/0165588 A1 Jun. 3, 2021

(30) Foreign Application Priority Data

Nov. 29, 2019 (EP) ..................................... 19212510

(51) Int. Cl.
*G06F 3/06* (2006.01)
(52) U.S. Cl.
CPC .......... *G06F 3/0631* (2013.01); *G06F 3/0604* (2013.01); *G06F 3/064* (2013.01); *G06F 3/0676* (2013.01); *G06F 3/0679* (2013.01)
(58) Field of Classification Search
CPC ...... G06F 3/0604; G06F 3/064; G06F 3/0676; G06F 3/0679; G06F 3/0631
USPC ............ 711/154, 163, 164, 152, 203, 12.094
See application file for complete search history.

(56) References Cited

U.S. PATENT DOCUMENTS

| 10,419,483 | B1* | 9/2019 | Allen | .................. G06F 9/45516 |
| 2003/0188173 | A1* | 10/2003 | Zimmer | .................. G06F 21/57 |
| | | | | 713/189 |
| 2005/0268095 | A1* | 12/2005 | O'Connor | ........... G06F 12/1009 |
| | | | | 711/E12.102 |

(Continued)

FOREIGN PATENT DOCUMENTS

EP 1429246 A1 6/2004

OTHER PUBLICATIONS

Extended European Search Report (EESR) dated May 8, 2020 in EP Appl. 19212510.2.

*Primary Examiner* — Sanjiv Shah
*Assistant Examiner* — Edward Waddy, Jr.
(74) *Attorney, Agent, or Firm* — MEDLER FERRO WOODHOUSE & MILLS PLLC (57) ABSTRACT

Summarizing the invention, a computer-implemented method is provided. The computer-implemented method comprises: allocating, by an operating system kernel, a physical memory block for a privileged function; storing, by the operating system kernel, the privileged function in the physical memory block; creating, by the operating system kernel, an entry for the physical memory block in a mapping table, wherein the entry associates the physical memory block to a virtual memory block in an address space of a program; setting, by the operating system kernel, a security bit for the entry in the mapping table; executing, by a processor, the program in unprivileged mode; and if the program requests the privileged function: checking, by the processor, whether the security bit is set; if the security bit is set, switching, by the processor, execution to kernel mode for performing the privileged function.

16 Claims, 3 Drawing Sheets

(56) References Cited

U.S. PATENT DOCUMENTS

| | | | |
|---|---|---|---|
| 2011/0202739 A1* | 8/2011 | Grisenthwaite | G06F 21/74 711/E12.001 |
| 2014/0259149 A1* | 9/2014 | Circello | G06F 12/1458 726/16 |
| 2016/0371105 A1* | 12/2016 | Sieffert | G06F 8/656 |
| 2019/0012150 A1* | 1/2019 | Dimitrov | G06F 8/41 |

* cited by examiner

METHOD AND SYSTEM FOR CONTROLLING A SWITCH IN THE EXECUTION MODE OF A PROCESSOR

TECHNICAL FIELD

The following description relates to a method and a system for controlling a switch in the execution mode of a processor between user mode and kernel mode.

BACKGROUND

Computer systems distinguish between user processes and operating system processes, also called kernel processes or supervisor processes. A process is an executing instance of a program, which, in turn, is a specific set of ordered instructions.

Kernel processes have unrestrained access to the computer system resources, which means that they can execute all instructions, including privileged instructions (such as interacting with low-level hardware components). User processes are instead instances of utility and application programs, e.g. word processors and browsers, and have a limited access to the resources. In other words, kernel processes and user processes have a different privilege status within the computer system in order to ensure protection of the computer system from malicious or faulty software behaviour.

This separation is implemented at the hardware level by introducing at least two different execution modes for the processor: a kernel mode, i.e. a privileged mode for the kernel, and a user mode, i.e. an unprivileged mode for user programs.

Conventionally, the processor can switch from user mode to kernel mode by means of a system call. System calls are necessary because user processes at times need access to the resources that are usually off-limits because of security reasons. When a user program is executing and wants to perform a privileged instruction such as using a hardware resource, it must issue a request to the operating system. Every time such a request is issued, the kernel decides whether to grant access to the requested privileged instruction and, in the affirmative, executes said privileged instruction on behalf of the user program.

On modern processors, the time necessary to satisfy the request is in the order of several hundred nanoseconds. Up to now, this overhead was in any case negligible in comparison to the time needed to access secondary storage such as a hard disk drive or a solid-state drive.

However, upcoming memory technologies like non-volatile random-access memory (e.g. magnetoresistive random-access memory) are much faster than conventional secondary storage. Consequently, the system call may in the future represent the bottleneck in the execution of processes.

Furthermore, a system call leads to pipeline stalls. Pipelining is an implementation technique whereby multiple instructions are executed in parallel by a processor, thereby increasing the processor throughput, i.e. the number of instructions completed per unit of time. In order to implement pipelining, the processor needs to be able to "plan ahead", namely to know which instructions will be executed in the near future and organize the execution of each instruction in the modular manner that allows pipelining. However, a system call invoking an operating system service from a user program does not provide enough information to the processor for forecasting the upcoming instructions because of using registers to store the functions being referenced by the system call. Therefore, the performance of the pipelining is degraded, affecting the processor throughput.

SUMMARY

It is an object of the invention to enable a more efficient execution of unprivileged, e.g. user, processes requesting kernel services, in particular time-wise, while still preserving the computer security.

The achievement of this object in accordance with the invention is set out in the independent claims. Further developments of the invention are the subject matter of the dependent claims.

According to one aspect, a computer-implemented method is provided. The computer-implemented method comprises:

allocating, by an operating system kernel, a physical memory block for a privileged function;

storing, by the operating system kernel, the privileged function in the physical memory block;

creating, by the operating system kernel, an entry for the physical memory block in a mapping table, wherein the entry associates the physical memory block to a virtual memory block in an address space of a program;

setting, by the operating system kernel, a security bit for the entry in the mapping table;

executing, by a processor, the program in unprivileged mode; and if the program requests the privileged function:

checking, by the processor, whether the security bit is set;

if the security bit is set, switching, by the processor, execution to kernel mode for performing the privileged function.

Each computer system providing security needs an operating system, which is a set of programs allowing interaction with the hardware components and providing an execution environment to the applications running on the computer system. The kernel is the most important program of the operating system, being responsible e.g. for memory management, inter-process communication, and process management. The "operating system kernel" will be also referred to simply as "kernel".

A processor, as used herein, refers to central processing units, microprocessors, microcontrollers, reduced instruction set computers (RISC), digital logic circuits such as a Field-Programmable Gate Arrays (FPGA) or application specific integrated circuits (ASIC), and any other circuit or processor capable of executing the functions described herein.

Since the kernel is a program, it is executed by a processor. When a method step recites "by the operating system kernel" or if it is said that the kernel performs an action, it is only meant to emphasize that the kernel code contains instructions such that, when the kernel is executed by the processor, the given action is performed. Conversely, even if the kernel is not explicitly mentioned, it is possible that certain actions have their root in the kernel code. Under the term "kernel" all designs and/or implementations of the kernel should be understood, including e.g. monolithic kernel and microkernels.

A physical memory block is a contiguous chunk of the main memory of a computer, such as random-access memory (RAM). In particular, the term "physical memory block" may be used to refer both to the set of physical addresses and to the information (instructions and/or data) contained in this group of addresses.

A physical memory block may be a physical page (also called "page frame"), which is a fixed-length contiguous chunk. The physical page may e.g. have a size of 4 KiB or 8 KiB. Instead of fixed-size blocks of virtual addresses, the virtual memory may be divided into variable-size blocks called segments. Accordingly, the memory block may be a page or a segment.

A function is a section of a program that performs a specific task. As mentioned, some functions can only be executed in kernel mode in order to protect the computer system from faults and malicious behaviour. A privileged function is a function that can only be executed by a processor in kernel mode, such as changing the page table entries of a process. In other words, a privileged function is a function whose execution may potentially cause harm to the computer system, if improperly performed or performed with damaging intentions. Therefore, a privileged function should only be executed after ensuring that it is secure to do so. Examples of kernel services are process control and memory management, so that examples of privileged functions include creating and terminating a process, assigning physical pages to the page table of a process, or managing inter-process communication.

The kernel allocates a physical memory block for a given privileged function, e.g. the write function of a kernel-level file system. Allocating means that the kernel identifies a block of memory of sufficient size to contain the set of instructions forming the privileged function. Usually, one physical page is sufficient for a function, however it is understood that the kernel may allocate more than one physical page, i.e. a plurality of physical pages, if needed. The kernel allocates as many physical pages as required for a given privileged function. Alternatively, the kernel may allocate one or lore physical segments.

Once available memory has been localized, the kernel stores the privileged function in the identified block of memory, namely in the allocated physical memory block(s), such as allocated physical page(s). Specifically, the kernel copies the privileged function from a source to the portion of main memory allocated for the privileged function, the source may be e.g. non-volatile memory of the computer system, such as the secondary storage, or the Internet, via a download from a secure server. Further, the privileged function may be a user-specific or program-specific function, in the sense that the source may be determined/defined by the user and/or the program (e.g. the user or the program downloads the privileged function from the Internet). This may be the case for trusted users and applications as discussed further below.

A process runs in a part of memory available to the program, which is called address space. The addresses that the program can use to store instructions and data are usually virtual addresses. Virtual memory is a memory management technique that combines main memory and secondary storage, so that the virtual addresses can correspond to a physical location either in main memory or secondary storage.

The virtual memory is usually divided into virtual memory blocks, i.e. contiguous chunks of virtual addresses. In particular, the term "virtual memory block" may be used to refer both to the set of virtual addresses and to the information (instructions and/or data) contained in this group of addresses. The virtual memory blocks may be virtual pages (also called "memory pages"), i.e. fixed-length contiguous chunks of virtual addresses. The sizes of a physical page and a virtual page are typically the same, given a processor architecture. Alternatively, the virtual memory blocks may be virtual segments, i.e. contiguous chunks of virtual addresses with variable length.

The process of translating the virtual addresses into physical addresses is called mapping and is performed by means of a mapping table, the mapping table having an entry for each virtual memory block. The mapping table may have a hierarchical structure. The hardware component responsible for the mapping is the memory management unit.

If the memory blocks are pages, the mapping table is a page table. Each page table entry includes a page frame address specifying the physical starting address of the physical page corresponding to the starting address of a given virtual page.

Segmentation uses a segment table as mapping table to translate between virtual addresses and physical addresses, wherein the virtual address is typically specified by two quantities i.e. segment number and offset.

Further, a mapping table entry may comprise one or more status bits, indicating e.g. whether the physical memory block may be written to.

In other implementations, a different structure can be used for the mapping, which is called inverted page table and uses a hashing function to reduce the size of the page table.

The principles of the invention are independent of the specific memory system used. Therefore, although in the following reference will be made to page tables mapping pages, a security bit can be similarly set for entries in inverted page tables and/or for segment tables referring to segments.

A virtual page in the address space of a program referencing a privileged function is associated by means of the page table to the physical page storing the privileged function. In other words, the virtual page, if accessed, will be mapped by the memory management unit to the physical page of the privileged function. Therefore, it can be said, for short, that by means of the association in the page table entry the privileged function is mapped into the address space of the program.

According to the invention, the page table entry for the physical page of the privileged function comprises at least one status bit called security bit. A bit is a unit of data that can have only one of the two values of a binary state, e.g. status set or not set, which are in the following also referred to as "complementary values". Usually these values are denoted with 0 and 1:0 is the complementary value of 1 and 1 is the complementary value of 0. The security bit has the function of changing the operating mode of the processor at the hardware level from unprivileged mode to kernel mode, as will be explained below.

Accordingly, the page table entry for the physical page of the privileged function comprises the physical starting address of the physical page and the respective security bit. The kernel can set the security bit, i.e. can set or change its value to '1'. The security bit is intrinsically associated with the privileged function stored on the physical page. In other words, the kernel assigns the security bit to the privileged function and by doing so it defines a security status of the privileged function.

If more than one physical page has been allocated for the privileged function, the security bit may be set only for the first physical page of the plurality of pages on which the privileged function is stored. More precisely, the security bit may be set only for the page table entry for the first physical page of the privileged function.

The unprivileged mode is an execution mode that has less privileges than the kernel mode. In one preferred embodiment, there may be only one unprivileged mode, which is the user mode. In other words, there may be a duality in the execution mode, either kernel mode, with all the privileges, or user mode, with only a restricted number of privileges.

In another preferred embodiment, further execution modes beyond the kernel mode and the user mode may be present. In other words, the system may implement a plurality of hierarchical protection domains (also called protection rings) with different levels of privilege. Exemplarily, the kernel mode may correspond to the most privileged ring (e.g. the innermost ring or ring 0) and the user mode may correspond to the least privileged ring (e.g. the outermost ring or ring n-1, when there are n protection rings).

In other words, there may be a plurality of unprivileged modes, wherein the unprivileged mode corresponding to the ring closest to the kernel ring has less privileges than the kernel mode and each subsequent unprivileged mode has less privileges than the previous one, until the least privileged ring is reached. Accordingly, a plurality of security bits may be set for each transition from any unprivileged mode to the kernel mode, for example $\log_2 n$ or n-1 security bits for n protection rings. In some examples, there may be four protection rings.

Optionally, the mapping table entry may comprise additional status with different functions than the security bit(s). In a preferred embodiment, the mapping table entry may comprise at least a read/write (R/W) bit that controls read/write permissions and a user/supervisor (U/S) bit that controls whether the physical memory block can be addressed at all by a program executing in unprivileged mode, e.g. user mode. Since the physical memory block is mapped to the address space of a program, the U/S bit must be set. Instead, in order to preserve the security of the system, the R/W bit is not set, i.e. the memory block can only be read, so that the privileged function may not be modified.

The operations described above and performed by the kernel set up a privileged function that is mapped into the address space of a program. The program is generally executed in an unprivileged mode, i.e. a mode with less privileges than the kernel mode, and may require kernel services once or more. The program may be a user program, i.e. a program that can be executed by the processor in user mode.

Conventional system calls to request kernel services are typically not directly encoded by an application programmer. Instead, the programmer calls e.g. the write( )-function to write data to a file system. In case of an application written in the C programming language, the compiler would then translate this function call into a corresponding call to the, e.g. libc-library, a library of standard functions that can be used by all C programs. The libc library will then be linked to the application and the libc library transforms calls to the formerly mentioned write( )-function into system calls.

Similarly, after a privileged function has been mapped into the address space of an application, it can be called by the program directly or using a library like the libc library. In both cases, the program or the library have to be modified in order to be aware of the mapped privileged function, since calling it might require different arguments than calling a conventional system call. Furthermore, the program has to be aware of the address of the mapped privileged function. Exemplarily, this address might be provided by a different system call to the kernel, which needs to be performed only once.

The operations of allocating the physical memory block, storing the privileged function in the physical memory block, creating the entry and setting the security bit are coded in the operating system, specifically in its kernel. In one example, the kernel code may particularly be configured so that the allocation of the physical memory block and storing the privileged function in the physical memory block take place upon or right after booting up of the computer.

Then, exemplarily, the privileged function may be systematically mapped into the address space of a program by creating the entry in its mapping table and setting the security bit, e.g. every time a program is started.

In another example, these operations of mapping a privileged function may be triggered by the program itself at program start by calling a specific system call offered by the operating system. In this case, a system call only has to be performed once at application start, while every later call to the privileged function can be executed without kernel involvement. The mapping can be either explicitly requested by the application programmer or the compiler might include these calls while translating the program source code into e.g. an object code in order to create the executable, which is then loaded by the loader. In other words, the operations may be performed when preparations for the execution of the program are initiated.

Additionally or alternatively, if a program calls a privileged function using a system call with a certain frequency, the mapping of the privileged function into its address space may be shifted from being performed when the process is about to start to being performed systematically by the kernel or by a library mapping this system call on behalf of the program. In this case, a threshold may be set and the number of times the program is calling the privileged function may be tracked by the operating system or the library. If the number is higher than the threshold, the kernel code or the library may, in the future (e.g. subsequent boot-ups), systematically map the privileged function for the given program.

To summarize, the mapping of the privileged function (i.e. creating the entry in the mapping table and setting the security bit) may take place "automatically" when a program is started or upon a request by the program. In other words, the kernel may be configured to perform the mapping autonomously or in response to a system call by the program. According to a third hybrid option, the mapping may happen in response to a system call, but, if the mapping is often requested by a given program, it may be then performed by the kernel without the request by the program. While some of these options may involve a system call to the kernel, the execution of the privileged function within the program does not require a system call according to the invention.

In order to execute the program, the program is usually loaded from non-volatile memory into main memory, where it can be accessed by the processor. The processor executes the program, so that a process runs in the computer system. The program can be launched by a user or called by another program. As mentioned above, the processor has at least two execution modes, an unprivileged mode such as user mode and kernel mode, which are hardware-implemented by means of a flag in the processor architecture. When the flag is set, the processor is in kernel mode and can execute also privileged functions, whereas, if the flag is not set, privileged functions cannot be executed.

The processor runs the program in unprivileged mode, e.g. user mode. If the program requires a kernel service, the program calls a corresponding privileged function, such as a write function. In other words, one instruction in the program may contain a call function to the privileged function (e.g. call write( )). The call function may in some examples be handled via a wrapper function that might be implemented in an additional library loaded by the application.

Since the privileged function was mapped by the kernel in the address space of the program, the processor can access the privileged function without the need for a conventional system call. In other words, the system call handler can be dispensed with, when it comes to a request of the privileged function by the program.

In particular, when the memory management unit accesses the mapping table to map the virtual memory block associated to the physical memory block of the privileged function, the processor checks whether the security bit is set, i.e. whether the value of the security bit is 1. Specifically, the code of the user program contains an instruction that makes the processor check the security bit. In particular, the code of the user program, when e.g. compiled or assembled, may translate to a machine language instruction that checks the security bit.

In one example, this check may be performed every time a function, be it privileged or not, is called in a user program. In another example, the instruction of checking the security bit is only executed when a privileged function is called.

If the security bit is set, the processor changes execution mode from user mode to kernel mode. The switch in the execution mode of the processor happens at hardware level, as explained. In other words, when the processor finds that the security bit is set, the microcode of the processor modifies the flag in the processor architecture. The value '1' of the security bit in the entry of the mapping table triggers the activation of the kernel mode flag: when the kernel mode flag is set, the processor executes in kernel mode, otherwise in unprivileged (e.g. user) mode. Once the processor is in kernel mode, it can perform the privileged function requested by the user program for the user program, e.g. writing to storage. Accordingly, the method comprises performing the privileged function in kernel mode.

If the security bit is not set, there may be two possibilities, according to whether the check is performed for all calls to functions or only for calls to privileged functions.

If the check is made only for privileged functions, a call to the privileged function may trigger, e.g., an error code, which is a software interrupt signal. In this case, the program can continue to run and use a conventional system call to call the functionality in kernel mode.

When the security bit is checked for every call to a function, if the security bit is not set for a privileged function (i.e., the processor does not automatically switch to kernel mode), then the processor may trap into the operating system's kernel as soon as the first instruction in the privileged function is executed and the operating system's kernel can perform its error handling. For example, a failure handling function may be called, which might terminate the program.

The invention introduces an extension and/or modification to the instruction set architecture (ISA) that allows the kernel to selectively and securely map privileged functionality into the address space of a user program, enabling a direct call to privileged instructions without performing a system call every time while maintaining a secure environment. The predictable control flow within the user program can be used by the processor to pre-fetch the privileged function and, thus, to reduce the number of pipeline stalls.

The mapping is performed by the operating system once, while the function itself can be called an arbitrary number of times within the user process. In other words, the operations:

allocating, by an operating system kernel, a physical memory block for a privileged function;

storing, by the operating system kernel, the privileged function in the physical memory block;

creating, by the operating system kernel, an entry for the physical memory block in a mapping table, wherein the entry associates the physical memory block to a virtual memory block in an address space of a program;

setting, by the operating system kernel, a security bit for the entry in the mapping table;

are performed only once, for a given privileged function. Conversely, the operations:

executing, by a processor, the program in unprivileged mode; and if the program requests the privileged function:

checking, by the processor, whether the security bit is set;

if the security bit is set, switching, by the processor, execution to kernel mode for performing the privileged function;

can be performed once or multiple times.

It should be noted that the invention involves a modification in the hardware and the software of a computer system. In particular, the software has to be modified in that the kernel code has to be configured to perform the actions described above, in particular mapping the privileged function. Further, the user program code has to be configured to call the privileged function directly, without a system call, and make the processor check the security bit. The hardware has to be modified so that setting the security bit can be translated into setting the flag that controls the switch in the execution mode of the processor. In particular, the processor needs to be able to check for the bit and verify its value.

The kernel can map any number of privileged functions in the address space of the user program. In one example, the method may comprise:

allocating, by an operating system kernel, a plurality of physical memory blocks for a plurality of privileged functions, wherein each physical memory block is allocated for a respective privileged function;

storing, by the operating system kernel, each privileged function in the correspondingly allocated physical memory block;

creating, by the operating system kernel, an entry for each physical memory block of the plurality of physical memory blocks in a mapping table, wherein each entry associates each physical memory block to a respective virtual memory block in an address space of a program;

setting, by the operating system kernel, a security bit for each entry in the mapping table.

According to another example, a plurality of privileged functions can be stored in the same physical memory block. Accordingly, a security bit may be set for all the privileged functions stored in the physical page, thereby allowing direct execution of all privileged functions by the processor in kernel mode.

Alternatively, only a proper subset of the addresses corresponding to the physical page storing the privileged functions may be "cleared" for direct execution from within a user program. In other words, instead of a page-level security, a fine-granularity security may be achieved at the level of addresses within a page by making the checking of the security bit dependent on which address in the page is to be called.

In this case, the method may comprise:

allocating, by an operating system kernel, a physical memory block for a plurality of privileged functions;

storing, by the operating system kernel, the plurality of privileged functions in the physical memory block;

creating, by the operating system kernel, an entry for the physical memory block in a mapping table, wherein the entry associates the physical memory block to a virtual memory block in an address space of a program;

setting, by the operating system kernel, a security bit for the entry in the mapping table;

executing, by a processor, the program in unprivileged mode; and if the program requests a given privileged function of the plurality of privileged functions:

checking, by the processor, whether an address of the given privileged function in the physical memory block satisfies a predetermined condition;

if the predetermined condition is satisfied, checking, by the processor, whether the security bit is set;

if the security bit is set, switching, by the processor, execution to kernel mode for performing the given privileged function.

As explained above, the memory block may be a page or a segment. In the following, reference is made to pages, however the same principles apply to segments.

Exemplarily, the number of cleared addresses may be lower than the number of privileged functions being stored in that page and only addresses having the last n bits of their address being set to zero would be cleared for direct execution. If, e.g., the page size of the processor architecture is set to 4 Kbyte and the implementation allows eight different privileged functions to be stored in each page, but only four of them are cleared (e.g. the first, third, fifth and seventh), then e.g. the last 10 bits of the called page address have to be zero to be a valid address. A valid address is an address for which the security bit is evaluated by the processor and is an address that satisfies a predetermined condition, e.g. that the last 10 bits have to be zero. In this case, the operating system mapping privileged functions into the address space of a program has to ensure that the mapping of the functions is aligned to the corresponding offsets in the page.

If the address of the privileged function does not satisfy the predetermined condition, an error code may be generated.

The reason for an address-level security is that arbitrary function calls into a page with privileged functions may lead to vulnerabilities. In some examples, the functions that are not cleared for a direct call may still be called indirectly by the cleared ones.

The number of privileged functions being stored into a physical page might be a constant for a specific CPU architecture or it might be variable, and the number of stored privileged functions may be stored in additional bits for this page.

In a preferred embodiment, setting, by the operating system kernel, a security bit for the entry in the mapping table, may be subject to conditions.

Exemplarily, the operating system's kernel may decide whether to set the security bit based on which user is logged in. A login session is the period of time between a user logging in and logging out of a computer system. The steps of the computer-implemented method described above occur during a given login session. The kernel may check which user is running the login session, i.e. which user is logging or has logged in the computer system and determine whether to set the security bit based on which user is running the login session.

In particular, the kernel may determine whether the user is trustworthy. If the user is trustworthy, the kernel sets the security bit corresponding to the privileged function. If the user is not trustworthy, the kernel does not set the security bit for the mapping table entry. The determination of whether the user is trustworthy may be accomplished for example on the basis of a past behaviour of the user, a lookup table with a list of trustworthy users, an authentication of the user in response to a prompt.

Accordingly, setting the security bit for a specific privileged function may "free" the privileged function for direct execution by the processor in kernel mode for a process of a given user.

Additionally or alternatively to the user-based determination, the setting of the security bit may be conditional on the program whose address space the privileged function is mapped to. In particular, there may be a program whose execution can be trusted not to cause any harm to the system even when a privileged function is performed. For example, if the program is confined, i.e. it is the only program running, or if multiple programs are running but they trust each other. Accordingly, setting the security bit for the entry in the mapping table may comprise determining, by the operating system kernel, whether to set the security bit based on the program, i.e. based on whether a program is trustworthy or not. As mentioned above, the privileged function needs not be provided by the operating system, but may be provided e.g. by a user or by the program itself.

In another preferred embodiment, the method may further comprise:

creating, by the operating system kernel, one or more additional entries for the physical memory block in one or more additional mapping tables, wherein each of the one or more additional entries associates the physical memory block to a respective additional virtual memory block in a respective additional address space of each of one or more additional programs;

setting, by the operating system kernel, a respective additional security bit for each of the one or more additional entries in the one or more mapping tables;

executing, by the processor, any of the one or more additional programs in unprivileged mode; and if the executing additional program requests the privileged function:

checking, by the processor, whether the respective additional security bit is set;

if the respective additional security bit is set, switching, by the processor, execution to kernel mode for performing the privileged function.

In other words, the privileged function may be mapped to more than one address space, corresponding to more than one program. Each entry associates the physical memory block in which the privileged function is stored to a virtual memory block belonging to the address space of a program out of a plurality of programs. For each entry, a security bit is set, so that, when one of the plurality of programs runs and calls the privileged function, the processor can execute the privileged function without a system call.

In a preferred embodiment, the method may further comprise, after execution of the privileged function in kernel mode, switching, by the processor, execution to unprivileged mode and executing, by the processor, a return function. For example, this instruction to switch back to user mode may be appended to the privileged function code, i.e. an instruction that leads to the manipulation of the hardware flag controlling the execution mode of the processor. The return function returns control to the unprivileged, e.g. user, process, which can then continue to run in unprivileged mode. The switch back is a responsibility of the operating system's kernel. For example, the kernel may insert the switch-back instruction in the privileged function code when storing the privileged function in the physical memory block. Accordingly, the privileged function code may contain main instruction(s), i.e. the instruction(s) that carry out the kernel service requested by the program, and secondary instructions, such as the switch-back instruction.

If the privileged function operates in a recursive manner, i.e. the privileged function calls itself while executing, or the privileged function calls other privileged functions, the presence of the switch-back instruction may provoke an untimely switch to unprivileged mode. In the example of a recursion, if the innermost nested instance of the privileged function has completed execution of its main instruction(s), the switch-back instruction at its end will cause the processor to exit the kernel mode and resume execution in the unprivileged mode, e.g. the user mode. However, as a consequence, the other instances of the privileged function will be prevented from completing execution in kernel mode, thereby leading to an error.

In order to address such an eventuality, a value for a counter variable (or simply "counter") may be set. Specifically, the counter value may be initialized at an initial value, e.g. at zero, and increased at each recursion of the privileged function. Then, every time an instance has finished execution, the value of the counter may be decreased and the switch-back instruction may be allowed to be executed only when the value of the counter is zero. In other words, there may be a conditional statement dependent on the counter value that controls the switch-back instruction. Accordingly, the secondary instructions in the privileged function code may comprise increasing/decreasing the counter value and comparing the counter value to a given value.

The same applies for a case in which different privileged functions contain calls to each other, with the counter value keeping track of calls to privileged functions in general.

To summarize, performing the privileged function may comprise a recursion of the privileged function in which the privileged function calls itself one or more times and/or a sequence in which the privileged function calls other privileged functions. Accordingly, the method may further comprise:

setting a counter value to an initial value;
increasing a counter value by one each time any privileged function is called;
decreasing the counter value by one each time execution of any privileged function is completed. In this case, switching execution to unprivileged mode and executing the return function are performed only if the counter value equals the initial value.

Every time the program requests the privileged function, the same steps of checking the security bit and switching, when it is set, directly to execution in kernel mode without a system call are performed.

If the kernel has mapped more than one privileged function to the address space of the program, the same procedure applies for calls to the different privileged functions.

Another aspect of the present invention relates to a processor. The processor is capable of performing the operations discussed hereinbefore.

In particular, the processor is configured to:
allocate, in kernel mode, a physical memory block for a privileged function;
store, in kernel mode, the privileged function in the physical memory block;
create, in kernel mode, an entry for the physical memory block in a mapping table, wherein the entry associates the physical memory block to a virtual memory block in an address space of a program;
set, in kernel mode, a security bit for the entry in the mapping table;
execute, in unprivileged mode, the program; and
if the program requests the privileged function:
check, in unprivileged mode, whether the security bit is set;
if the security bit is set, switch execution to kernel mode for performing the privileged function.

In a preferred embodiment, the processor is further configured (because of the kernel code) to check which user is running a current login session on a computer system to which the processor belongs and determine whether to set the security bit based on the user. The current login session is the login session during which the processor is performing the above operations. As explained above, the setting of the security bit is part of the kernel code, which is executed by the processor.

In a further preferred embodiment, a plurality of unprivileged modes is available and the processor is further configured to set a security bit for each unprivileged mode of the plurality of unprivileged modes for the entry in the mapping table.

In yet another preferred embodiment, the processor is further configured to, after execution of the privileged function in kernel mode, switch execution to unprivileged mode and execute a return function.

Performing the privileged function may comprise a recursion of the privileged function in which the privileged function calls itself one or more times and/or a sequence in which the privileged function calls other privileged functions. Accordingly, the processor may further be configured to:

set a counter value to an initial value;
increase a counter value by one each time any privileged function is called;
decrease the counter value by one each time execution of any privileged function is completed. In this case, the processor is configured to switch execution to unprivileged mode and execute the return function only if the counter value equals the initial value.

According to an example, the processor is configured to:
allocate a plurality of physical memory blocks for a plurality of privileged functions,
wherein each physical memory block is allocated for a respective privileged function;
store each privileged function in the correspondingly allocated physical memory block;
create an entry for each physical memory block of the plurality of physical memory blocks in a mapping table, wherein each entry associates each physical memory block to a respective virtual memory block in an address space of a program;
set a security bit for each entry in the mapping table.

According to another example, a plurality of privileged functions can be stored in the same physical memory block. In this case, the processor is configured to:
allocate a physical memory block for a plurality of privileged functions;
store the plurality of privileged functions in the physical memory block;
create an entry for the physical memory block in a mapping table, wherein the entry associates the physical memory block to a virtual memory block in an address space of a program;
set a security bit for the entry in the mapping table;

execute the program in unprivileged mode; and if the program requests a given privileged function of the plurality of privileged functions:

check whether an address of the given privileged function in the physical memory block satisfies a predetermined condition;

if the predetermined condition is satisfied, check whether the security bit is set;

if the security bit is set, switch execution to kernel mode for performing the given privileged function.

Another further aspect of the present invention relates to a computer system comprising a processor according to the above aspect.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
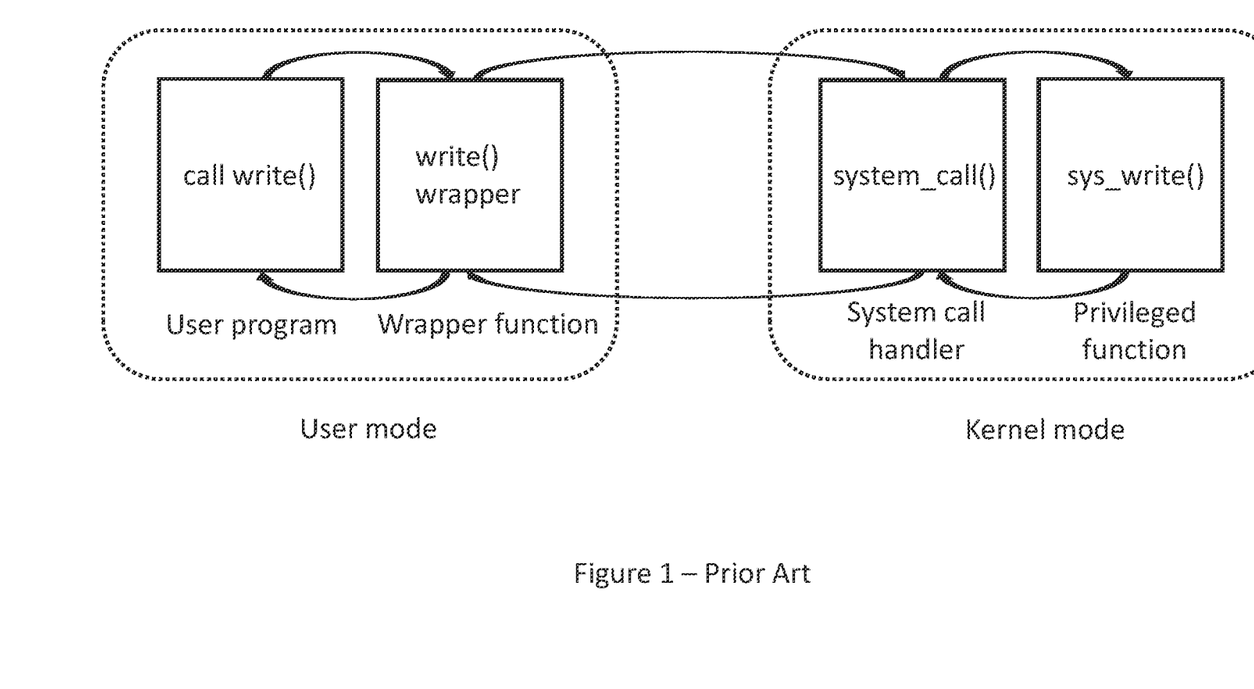
FIG. 1 shows a schematic representation of a system call according to the prior art.

FIG. 1 shows a conceptual representation of a system call according to the prior art, in particular for a Linux operating system.

When an application program is running, it may request a kernel service, e.g. writing to secondary storage, which means that the program code contains a call instruction to the write function, which is a privileged function. Usually the call instruction is managed by means of a wrapper function in a library, such as a C library. The wrapper function contains assembly language instructions that make the processor switch from user mode to kernel mode and then access an assembly language function, the system call handler. The system call handler performs various operations, among which invoking the actual privileged function and then making the CPU switch back to user mode.

The use of the system call handler causes pipeline stalls because the processor cannot predict the next operations. However, the system call handler is necessary in the current hardware/software implementations since the privileged function is encoded into a register.

Figure 2:
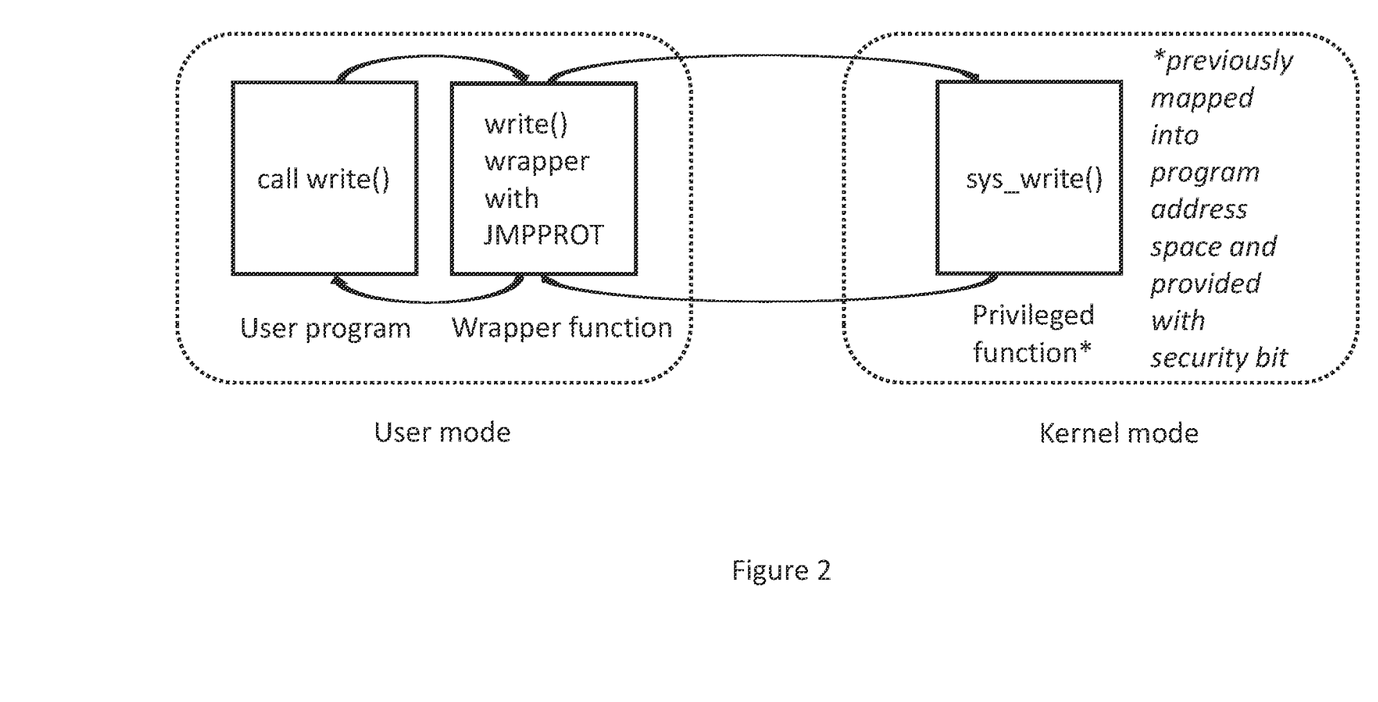
FIG. 2 shows a schematic representation of a call to a privileged function according to an example of the invention.

FIG. 2 shows a conceptual representation of a call to a privileged function according to an example of the invention. The assembly language instructions in the wrapper function are modified with respect to those of the prior art and the new set of assembly language instructions is indicated with the placeholder term JMPPROT. JMPPROT directly jumps to the privileged function, which is mapped into the address space of the user program and provided with a security bit in the page table entry. JMPPROT checks the security bit in the page table and, if it is set, modifies the hardware flag so that the processor immediately switches to kernel mode.

In other words, according to the present invention, both the library wrapper function code and the kernel code are modified with respect to existing ones. The kernel code is configured to set up the privileged function so that it is mapped in the address space of the program. Further the kernel code contains instructions for setting a new status bit, a security bit, that causes the processor to switch from user mode to kernel mode. On the other hand, the library wrapper function code is modified so that the assembly language instructions access directly, i.e. without the intermediation of the system call handler, the privileged function and check the security bit in the corresponding page table entry.

The responsibility for security that lies with the system call handler in the prior art is now shifted to the kernel code and "encoded" in the security bit. While conventionally the system call handler is executed every time that a privileged function is requested, the mapping of the privileged function by the kernel is performed only once. Accordingly, even if the mapping of the privileged function may involve one or more system calls, e.g. to trigger the mapping by the kernel in the first place, the system calls are dispensed with when the privileged function is requested by the user program.

Figure 3:
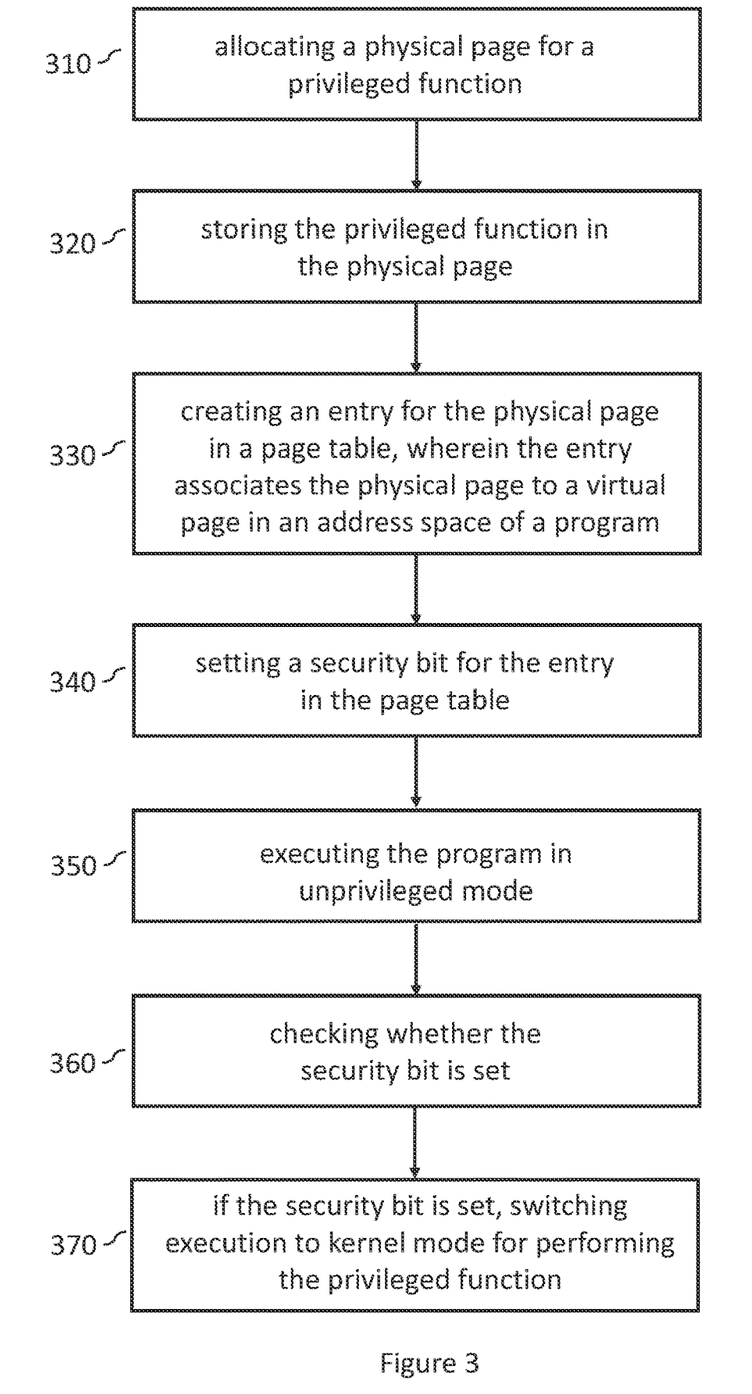
FIG. 3 shows a flow chart of an exemplary method for executing a privileged function.

FIG. 3 shows a flow chart of an exemplary method for executing a privileged function in the context of a user program.

At 310 one or more physical pages are allocated by the kernel of the operating system, which is executed by the processor, for a privileged function, namely a function that requires kernel privileges in order to be properly executed. One example of such a function is a write function that copies data from the main memory to a storage device, such as a disk.

After allocating the physical page(s), at 320 the kernel stores the privileged function in the physical page(s). Specifically, the kernel stores the instructions and/or the data of the privileged function in the physical addresses belonging to the allocated physical page(s).

The operating system of a computer system manages the memory and assigns different address spaces to the processes that are run. The address space for a program such as an application program is usually a virtual address space, i.e. belonging to the virtual memory. The application program addresses merely its own dedicated virtual addresses, while the operating system and the memory management unit take care of mapping the virtual addresses to physical addresses by means of a page table. For example, the application program is a word processor.

At 330 the kernel creates an entry for the physical page in the page table such that the physical page containing the privileged function is mapped to the address space of the application program. In particular, the physical page is associated to a virtual page in the address space. The entry in the page table contains the frame number indicating to which physical page the virtual page is mapped and then it contains a plurality of status bits, which mostly have a protection function.

At 340 the kernel sets one of these safety bits, the security bit. By setting the security bit the kernel leaves a piece of information that can later be retrieved by the processor.

Specifically, when setting the security bit for a privileged function mapped in the address space of a given program, the kernel "guarantees" that it is safe for the processor to switch directly from user mode to kernel mode while executing the given program and requiring the kernel service embodied by the privileged function.

Exemplarily, the kernel modifies additional status bits, the read/write bit and the user/supervisor bit. The user/supervisor bit is set in order to make the page addressable from an address space of an application program. The read/write bit is not set, i.e. it has a value of 0, so that the physical page(s) storing the privileged function can only be read but not written to.

In one example, steps 310-340 are performed as soon as the kernel is loaded upon turning on the computer system. i.e. belong to the default/routine operations of the kernel. In another example, steps 310-340 are performed once the user program is opened.

In some examples, before performing steps 310-340, the kernel determines whether the user logged in the computer system is trustworthy.

At 350 the application program is executed by the processor operating in user (i.e. unprivileged) mode. For instance, a user opens a word processor and starts modifying an existing document until he decides to save the changes made. In order to store the changes, access to the secondary storage is needed, which is a privileged operation. Accordingly, when the user clicks on the "save" icon, the program requests the privileged function that writes to the secondary storage.

If the privileged function is requested, at 360 the processor checks whether the security bit is set, namely it checks the value of the security bit stored in the entry of the page table referring to the physical page containing the requested privileged function. In particular, the way the application program calls the privileged function is changed, in that the JMPPROT command is used instead of a standard call function: JMPPROT addresses the privileged function mapped in the address space of the program via the page table and makes the processor check the security bit.

At 370, if the security bit is set, i.e. has a value of 1, the processor switches its operation mode from user mode to kernel mode in order to perform the privileged function, e.g. to write to secondary storage the changes made by the user to the document.

To summarize, the responsibility of "branding" a privileged function safe for execution is given to the kernel, which maps the privileged function to the address space of a program. The counterpart to this functionality of the kernel is a new way of calling directly the privileged function from within a user program, JMPPROT, according to which the security bit is checked, and a set security bit makes the processor directly switch to kernel mode and execute the privileged function in this mode without any switching overhead.

The invention claimed is:

1. A computer-implemented method comprising:
    allocating, by an operating system kernel, a physical memory block for a privileged function;
    storing, by the operating system kernel, the privileged function in the physical memory block;
    creating, by the operating system kernel, an entry for the physical memory block in a mapping table, wherein the entry associates the physical memory block to a virtual memory block in an address space of a program;
    setting, by the operating system kernel, a security bit for the entry in the mapping table responsive to determining that it is secure for a processor to switch directly from an unprivileged mode to a kernel mode while executing the program and requiring a kernel service embodied by the privileged function;
    executing, by the processor, the program in the unprivileged mode;
    requesting, by the program, the privileged function via a set of assembly language instructions that directly jumps to the privileged function mapped in the address space of the program via the mapping table and makes the processor check the security bit;
    checking, by the processor and responsive to the program requesting the privileged function, whether the security bit is set; and
    responsive to a determination that the security bit is set during the checking, switching, by the processor, execution to the kernel mode for performing the privileged function.

2. The computer-implemented method of claim 1, wherein the method is performed within a login session and wherein setting the security bit for the entry in the mapping table comprises:
    checking, by the operating system kernel, which user is running the login session; and
    determining, by the operating system kernel, to set the security bit based on a determination that the user is trustworthy.

3. The computer-implemented method of claim 1, wherein the unprivileged mode is one unprivileged mode out of a plurality of unprivileged modes and the security bit is one security bit among a plurality of security bits, and the method further comprises setting the plurality of security bits for the plurality of unprivileged modes for the entry in the mapping table.

4. The computer-implemented method of claim 1 further comprising:
    creating, by the operating system kernel, one or more additional entries for the physical memory block in one or more additional mapping tables, wherein each of the one or more additional entries associates the physical memory block to a respective additional virtual memory block in a respective additional address space of each of one or more additional programs;
    setting, by the operating system kernel, a respective additional security bit for each of the one or more additional entries in the one or more additional mapping tables; and
    executing, by the processor, any of the one or more additional programs in unprivileged mode as an executing additional program; and
requesting, by the executing additional program, the privileged function;
    checking, by the processor, whether the respective additional security bit is set; and
    responsive to a determination that the respective additional security bit is set, switching, by the processor, execution to kernel mode for performing the privileged function.

5. The computer-implemented method of claim 1 further comprising, after execution of the privileged function in kernel mode:
    switching, by the processor, execution to unprivileged mode; and
    executing, by the processor, a return function.

6. The computer-implemented method of claim 5, further comprising:
    performing the privileged function, including a recursion of the privileged function in which the privileged function calls itself one or more times or a sequence in which the privileged function calls other different privileged functions;

setting a counter value to an initial value;
increasing the counter value by one each time any privileged function is called;
decreasing the counter value by one each time execution of any privileged function is completed;
and wherein:
switching execution to unprivileged mode and executing the return function are performed when the counter value equals the initial value.

7. The computer-implemented method of claim 1, wherein the privileged function is one of a plurality of privileged functions, the plurality of privileged functions comprising additional privileged functions and the privileged function, the method further comprising:
allocating, by the operating system kernel, the physical memory block for the additional privileged functions;
storing, by the operating system kernel, the additional privileged functions in the physical memory block; and
checking, by the processor, whether an address of the privileged function in the physical memory block satisfies a predetermined condition; and
checking whether the security bit is set responsive to determining the predetermined condition is satisfied.

8. A processor configured to:
allocate, in a kernel mode, a physical memory block for a privileged function;
store, in the kernel mode, the privileged function in the physical memory block;
create, in the kernel mode, an entry for the physical memory block in a mapping table, wherein the entry associates the physical memory block to a virtual memory block in an address space of a program;
set, in the kernel mode, a security bit for the entry in the mapping table responsive to determining that it is secure for the processor to switch directly from an unprivileged mode to the kernel mode while executing the program and requiring a kernel service embodied by the privileged function;
execute, in the unprivileged mode, the program; and
request the privileged function by the program via a set of assembly language instructions that directly jumps to the privileged function mapped in the address space of the program via the mapping table and makes the processor check the security bit;
check, in the unprivileged mode and responsive to the program requesting the privileged function, whether the security bit is set; and
responsive to a determination that the security bit is set during the checking, switch execution to the kernel mode for performing the privileged function.

9. The processor of claim 8, wherein the processor is further configured to:
check which user is running a current login session; and
determine to set the security bit based on a determination that the user is trustworthy.

10. The processor of claim 8, wherein the unprivileged mode is one unprivileged mode out of a plurality of unprivileged modes and the security bit is one security bit among a plurality of security bits, and the processor is further configured to set the security bit for each unprivileged mode of the plurality of unprivileged modes for the entry in the mapping table.

11. The processor of claim 8, wherein the processor is further configured to:
create one or more additional entries for the physical memory block in one or more additional mapping tables, wherein each of the one or more additional entries associates the physical memory block to a respective additional virtual memory block in a respective additional address space of each of one or more additional programs;
set a respective additional security bit for each of the one or more additional entries in the one or more additional mapping tables;
execute any of the one or more additional programs in unprivileged mode as an executing additional program;
request via the executing additional program the privileged function;
check whether the respective additional security bit is set; and
in response to a determination that the respective additional security bit is set, switch execution to kernel mode for performing the privileged function.

12. The processor of claim 8, wherein the processor is further configured to, after execution of the privileged function in kernel mode:
switch execution to unprivileged mode; and
execute a return function.

13. The processor of claim 12, further comprising performing the privileged function includes a recursion of the privileged function in which the privileged function calls itself one or more times or a sequence in which the privileged function calls other different privileged functions;
set a counter value to an initial value;
increase the counter value by one each time any privileged function is called;
decrease the counter value by one each time execution of any privileged function is completed;
and wherein the processor is configured to switch execution to unprivileged mode and execute the return function when the counter value equals the initial value.

14. The processor of claim 8, wherein the privileged function is one of a plurality of privileged functions, the plurality of privileged functions comprising additional privileged functions and the privileged function, and wherein the processor is further configured to:
allocate the physical memory block for the additional privileged functions;
store the additional privileged functions in the physical memory block; and
check whether an address of the privileged function in the physical memory block satisfies a predetermined condition;
wherein the processor is configured to check whether the security bit is set responsive to determining the predetermined condition is satisfied.

15. A computer system comprising a processor according to any one of claims 9 to 14.

16. A computer-implemented method comprising:
allocating, by an operating system kernel, a physical memory block for a privileged function;
storing, by the operating system kernel, the privileged function in the physical memory block;
creating, by the operating system kernel, an entry for the physical memory block in a mapping table, wherein the entry associates the physical memory block to a virtual memory block in an address space of a program;
setting, by the operating system kernel, a security bit for the entry in the mapping table responsive to determining that it is secure for a processor to switch directly from an unprivileged mode to a kernel mode while executing the program and requiring a kernel service embodied by the privileged function;

executing, by a processor, the program in the unprivileged mode; and requesting, by the program, a switch to the kernel mode and access to the privileged function via a set of assembly language instructions that directly jumps to the privileged function mapped in the address space of the program via the mapping table and makes the processor check the security bit;

checking, by the processor and responsive to the program requesting access to the privileged function, whether the security bit is set; and responsive to a determination that the security bit is set during the checking, switching, by the processor, execution to the kernel mode for performing the privileged function.

* * * * *

UNITED STATES PATENT AND TRADEMARK OFFICE
CERTIFICATE OF CORRECTION

| | |
|---|---|
| PATENT NO. | : 11,789,621 B2 |
| APPLICATION NO. | : 17/105771 |
| DATED | : October 17, 2023 |
| INVENTOR(S) | : André Brinkmann |

It is certified that error appears in the above-identified patent and that said Letters Patent is hereby corrected as shown below:

In the Claims

Column 18, Claim 15:
"A computer system comprising a processor according to any one of claims 9 to 14" corrected to --A computer system comprising a processor according to any one of claims 8 to 14--.

Signed and Sealed this
Twelfth Day of December, 2023

Katherine Kelly Vidal
*Director of the United States Patent and Trademark Office*